Dec. 7, 1954 A. V. HAEFF ET AL 2,696,554

MICROWAVE SIGNAL GENERATOR

Filed Oct. 16, 1945 7 Sheets-Sheet 1

Inventor
ANDREW V. HAEFF
THURE E. HANLEY

By [signature]

Attorney

Dec. 7, 1954 A. V. HAEFF ET AL 2,696,554

MICROWAVE SIGNAL GENERATOR

Filed Oct. 16, 1945 7 Sheets-Sheet 2

Inventors
ANDREW V. HAEFF
THURE E. HANLEY

By [signature]

Attorney

Dec. 7, 1954 A. V. HAEFF ET AL 2,696,554

MICROWAVE SIGNAL GENERATOR

Filed Oct. 16, 1945 7 Sheets-Sheet 3

Inventors
ANDREW V. HAEFF
THURE E. HANLEY

By [signature]

Attorney

Inventors
ANDREW V. HAEFF
THURE E. HANLEY
By Ralph L. Chappell
Attorney

Inventor
ANDREW V. HAEFF
THURE E. HANLEY

By [signature]
Attorney

Dec. 7, 1954 A. V. HAEFF ET AL 2,696,554

MICROWAVE SIGNAL GENERATOR

Filed Oct. 16, 1945 7 Sheets-Sheet 6

Inventors
ANDREW V. HAEFF
THURE E. HANLEY

By [signature]

Attorney

Inventors
ANDREW V. HAEFF
THURE E. HANLEY
By Ralph L. Chappell
Attorney

United States Patent Office 2,696,554

Patented Dec. 7, 1954

2,696,554

MICROWAVE SIGNAL GENERATOR

Andrew V. Haeff and Thure E. Hanley, Washington, D. C.

Application October 16, 1945, Serial No. 622,658

14 Claims. (Cl. 250—17)

(Granted under Title 35, U. S. Code (1952), sec. 266)

This invention relates to signal generators and more particularly to signal generators suitable for generation of microwaves in the form of pulses having certain characteristics.

For the alignment and calibration of microwave equipment and for certain other work with microwaves, it is often necessary to have a signal generator in which certain variables are capable of control at the will of the operator. The most important variables are: frequency, pulse-duration, pulse-delay, and pulse-amplitude. It may also be desired to generate pulses having a controlled pulse-repetition rate and to supply synchronizing pulses to external utilization equipment and to provide means for generating either unmodulated R. F. energy or energy modulated by an internal or external source either in frequency or amplitude.

Accordingly, it is an object of this invention to provide a microwave signal generator of adjustable frequency.

Another object of this invention is to provide a microwave generator which produces pulses of predetermined duration, selectable by the operator from several specific, precise, durations, or from a variable duration.

It is another object of this invention to provide a controllable time-delay between the input synchronizing signal pulse and the out-put microwave pulse produced by a microwave signal generator.

A still further object of this invention is to provide a pulse generator which is capable of being synchronized to an input signal pulse, or alternatively, which may be free-running to provide output pulses of predetermined controllable pulse-repetition rate for synchronizing external utilization equipment.

Another object of this invention is to produce pulses of the characteristics aforementioned having an amplitude which may be attenuated in measurable amount from a standard power level indicated by means of an indicator located on the front panel of the microwave signal generator cabinet.

A still further object of this invention is the utilization of a long waveguide cavity for the storage of microwave electrical energy, at a measurable voltage level, and to simultaneously utilize this cavity as a sensitive frequency measuring device.

Another object of this invention is the isolation of the components in which microwaves are generated while permitting external mechanical and electrical means to control the operation of the isolated microwave generator components.

Still another object of this invention is to provide a novel mechanical system for adjusting the frequency of a microwave oscillator tube and to provide certain limits of operation for the aforesaid mechanical system to prevent damage to the aforesaid oscillator tube elements.

Another object of this invention is to provide a means for indicating a definite measured power level and to provide means for obtaining a calibrated attenuation from the said power level.

It is also an object of this invention to provide pulses having characteristics described above, said pulses having extremely sharp edges.

Other objects, features and advantages of the invention will be apparent from the following detailed description of preferred embodiments of the invention made in connection with the accompanying drawings, in which:

Figs. 1A and 1B comprise a schematic diagram of the circuit of a preferred embodiment of this invention. Superimposed on the schematic diagram are numerous blocks indicated by dotted rectangles which separate the circuit functions. The dotted rectangles do not necessarily represent shielding except in the case of block 19 which contains the microwave generator components.

Figure 1A:
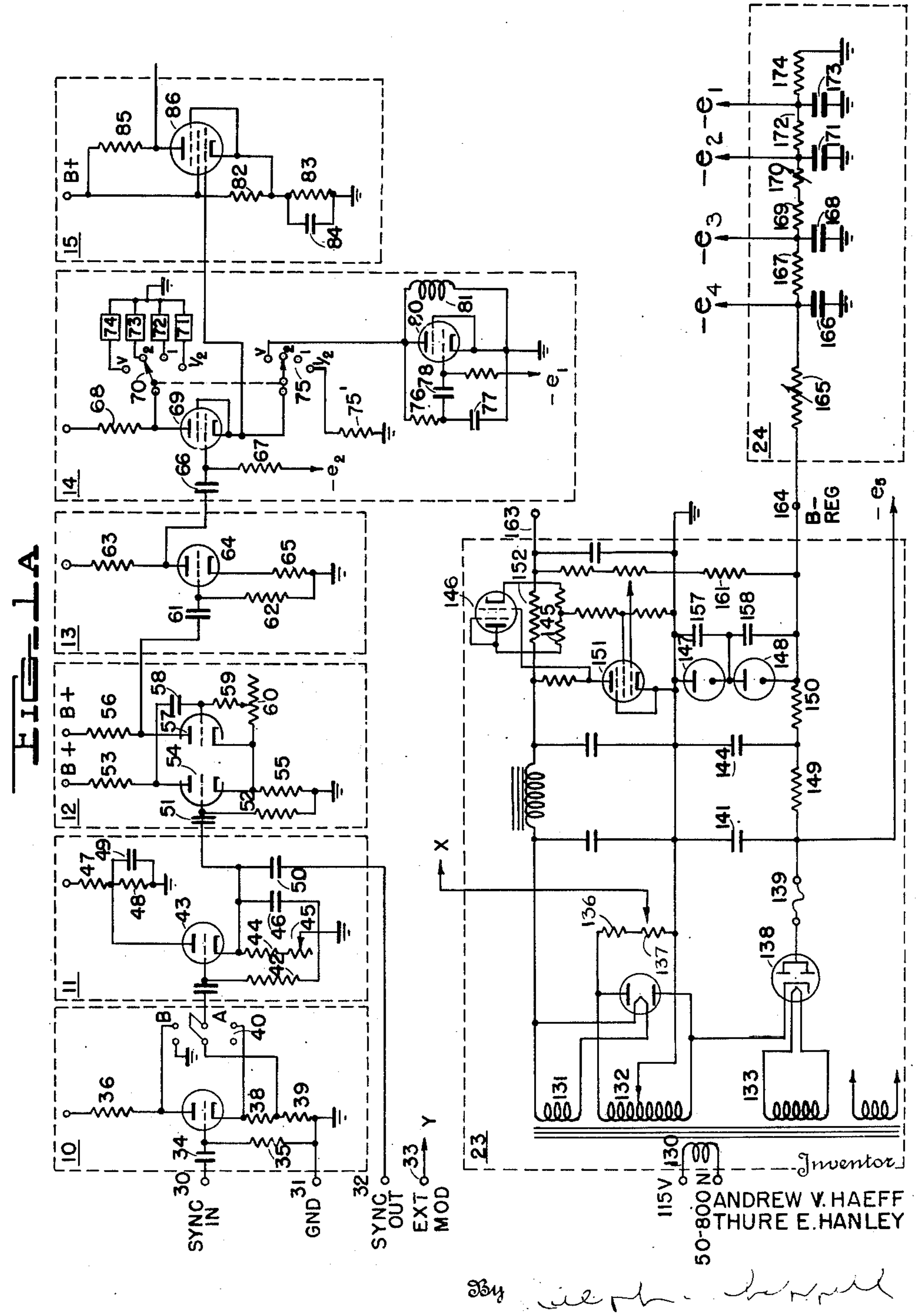

Referring more particularly to Fig. 1A there is shown a schematic diagram of a preferred form of power supply, control and pulser circuits for the signal generator of this invention. Superimposed on the schematic diagram is a block diagram indicating the various circuit functions.

Referring to the circuit shown in block 10, if the pulses which arrive from an external source are positive, switch 40 is placed in position A, whereupon the input to block 11 comprises positive pulses. However, if the input synchronizing pulses, which arrive from an external source, are negative, then switch 40 is placed in position B and the output to block 11 again comprises positive synchronizing pulses.

The sawtooth generator shown in block 11 comprises a gas tube 43, for example, a type 884. The operation of the sawtooth generator circuit is as follows:

Voltage divider 47 and 48 in combination with capacitor 49 supply the plate of gas tube 43 with a steady low positive voltage of the order of 50 volts. When a positive synchronizing pulse is applied to the grid, the gas tube 43 suddenly becomes conducting, and current flows into condenser 46 which rapidly charges to maximum potential, thus reducing the voltage difference across the gas tube 43 which thereupon ceases to conduct. Thereafter condenser 46 discharges at a rate which is determined by the sum of the resistances of resistors 44 and 45, the rate being adjustable by means of variable resistor 45.

In the absence of input synchronizing pulses it is often necessary to operate the signal generator at a controlled pulse-repetition rate. Consequently, in the absence of a synchronizing input pulse, the sawtooth generator shown in block 11 may be operated as a free-running device which generates a sawtooth wave the period of which is determined by the adjustment of resistor 45. Synchronizing output pulses may be obtained from the free-running sawtooth generator through coupling capacitor 50 to the output jack 32.

When the sawtooth generator is being synchronized by the input signal, resistor 45 must be adjusted so that the free-running period is approximately that of the input synchronizing signal.

In either case, synchronizing pulses from the sawtooth generator are coupled through capacitor 51 into the delay multivibrator shown in block 12.

The purpose of the delay multivibrator is to introduce a specific time delay between the input synchronizing pulse and the output microwave pulse from the signal generator. This is accomplished by causing the input synchronizing pulse to trigger the multivibrator, which thereupon produces a positive pulse, the controlled duration of which is equal to the desired time-delay. The positive pulse is inverted, producing a negative pulse, which is passed through a differentiator circuit. The differentiator circuit converts the negative voltage pulse to a sharp negative voltage "pip" followed by a sharp positive voltage "pip," the duration between pips being the desired time delay. The negative voltage pip has no effect, but the following positive voltage pip triggers the pulser circuit which generates a sharp pulse having a definite duration.

In the delay multivibrator circuit, triodes 54 and 57 may comprise a 6SN7 tube connected as shown. The triode element 57 is normally conducting causing a current flow through resistor 55 which causes triode element 54 to become nonconducting since its cathode is maintained thereby at a higher potential than its grid. However, when the gas tube 43 in the sawtooth generator 11 is suddenly triggered on and permits capacitor 46 to charge rapidly, a positive pulse is thereby suddenly produced and applied through coupling capacitor 51 to the grid of triode 54, which thereupon causes triode 54 to become conducting. A current then flows through resistor 53 and the now conducting triode 54 thereby producing a voltage drop at the plate of the triode 54, which negative pulse is coupled through capacitor 58 onto the grid of the tube element 57, which becomes nonconducting. The current through resistor 56 is suddenly cut off, causing the voltage at the plate of 57 to increase.

The duration of the positive pulse produced by the delay multivibrator is controlled by variable resistor 60. Variable resistor 60 controls the rate at which capacitor 58 discharges, subsequent to the instant that triode 54 becomes conducting. As capacitor 58 discharges, the grid of triode 57 increases in potential relative to its cathode until triode 57 again becomes conductive, its plate dropping in potential, thus terminating the positive pulse generated by the delay multivibrator 12.

The duration of the positive pulse produced at the plate of triode 57 constitutes the desired time-delay between input synchronizing signals and the output high-frequency pulses. The positive pulse is coupled from the plate of triode 57 through coupling capacitor 61 into the inverter amplifier 13, which produces a corresponding negative pulse. The negative pulse is applied to the differentiator elements which comprise capacitor 66 and resistor 57, thus applying to the grid of gas tube 69 a negative voltage pip followed by a positive voltage pip, with an adjustable time delay therebetween, as above set forth.

The circuit shown in block 14 is a special pulser circuit disclosed and claimed by Morton H. Kanner in co-pending application Serial No. 542,343, filed June 27, 1944, now Patent No. 2,496,543.

This circuit has the characteristic of forming extremely sharp pulses, that is, pulses having very short rise time and a very short dropping time, which, in a preferred embodiment of this invention produces pulses of lengths ½, 1, and 2 micro-seconds and a variable pulse length from 0.2 to 10 micro-seconds.

The pulser circuit comprises two gas tetrodes 69 and 80, such as type 2050 tubes. Only one of the gas tetrodes, that is, tube 69, is used for generating the first three pulse-lengths, ½, 1 and 2 micro-seconds, in conjunction with the pulse forming networks 71, 72 and 73 respectively. The delayed input synchronizing pulse which appears on the grid of tube 69 is the positive voltage pip, preceded by a negative voltage pip corresponding to the original undelayed synchronizing pulse. Only the positive voltage pip, or delayed input synchronizing pulse, is now effective to trigger tube 69, causing it to become conducting.

When gas tetrode 69 triggers, current flows through resistor 75' causing the voltage to rise suddenly on the grid of tube 86. At the same time, the current through resistor 68 causes a sudden reduction of voltage at the plate of tube 69, which appears as a negative wave travelling down the pulse-forming network. The pulse-forming network is terminated by a high impedance and therefore reflects the incident negative wave without change of sign.

When the negative wave travels down the pulse-forming network and is reflected back, it appears at the plate of gas tetrode 69 as a sudden drop in the potential, a definite time having transpired for the negative wave to travel down the pulse-forming network and return. When the negative wave returns and causes the sudden potential drop at the plate, conduction ceases, and the potential drops sharply at the cathode, thus terminating the positive pulse. The various pulse networks, 71, 72 and 73 require different times of travel down and back, and this factor determines the duration of the sharp positive pulse formed by this pulser circuit, which is applied to the grid of tube 86. When a very short pulse is desired or when a pulse of intermediate length between the ½, 1 or 2 microsecond pulses is desired, the selector switch 75 is connected to the plate of tube 80 which is shunted by inductor 81, and resistor 76 in series with the capacitor 77. Resistor 76 is variable.

The operation of the circuit elements associated with tube 80 is as follows:

When selector switch 75 is connected to the plate of tube 80, the selector switch 70 is simultaneously connected to pulse-forming network 74. Pulse-forming network 74 requires a relatively longer time for the negative voltage wave to travel down and return and thus the tube 69 conducts for a time in excess of any desired variable pulse time.

At the start of the pulse when tube 69 suddenly conducts, current flows through resistor 76 and charges capacitor 77. The sudden application of voltage across inductor 81 initially generates an opposing voltage across the inductor 81, which sustains the voltage across the gas tetrode 80 for a considerable length of time. As capacitor 77 charges, the voltage rise is coupled through capacitor 78 onto the grid of gas tetrode 80 until the tube 80 suddenly conducts. The time required to cause the tube 80 to conduct will depend upon the value of the resistor 76, since this controls the charging rate of capacitor 77. Resistor 76 may be adjusted, thereby enabling the duration between the time the pulse is applied to tube 80 and the time tube 80 conducts to be varied. When tube 80 suddenly conducts, the resistance between the plate of tube 80 and ground suddenly diminishes to a low value, thereby decreasing the voltage drop across the plate 80. This extremely rapid decrease in voltage is coupled onto the grid of tube 86. Voltage $-e_1$ on the grid causes tube 80 to become non-conducting when the voltage across the tube 80 is decreased; and the voltage $-e_2$ causes the tube 69 to become non-conducting when the voltage across the plate of tube 69 decreases at the end of the pulse. Another function of inductor 81 is to provide a low impedance path between the outer terminals of resistor 76 and capacitor 77 so that the capacitor may be discharged during the time the circuit is inoperative between pulses.

Summarizing, the effect of tube 69 is to suddenly increase the voltage on the grid of 86, and the effect of tube 80 is to suddenly decrease that voltage a given time duration subsequent thereto.

A conventional clipper amplifier is shown in block 15 utilizing, for example, a type 6AC7 tube for tube 86. Application of a positive pulse with an irregular peak of considerable amplitude produces a negative pulse at the plate of tube 86 which has been clipped so that a "square" top is obtained. The plate potential of tube 86 drops below the screen voltage as current is drawn through resistor 85, thereby reducing the proportion of current which flowed through the plate and through resistor 85. The clipping action is produced by the limiting of the current flow through the resistor 85.

The square topped negative wave is coupled through capacitor 87 into the amplifier inverter shown in block 16. The amplifier inverter circuit is compensated for the interelectrode capacity of the tube and distributed capacitance by inductor 90 in the plate circuit, thereby maintaining the sharpness of rise and fall of the pulse which has been generated in block 14 and at the same time increasing the amplitude of that pulse. The sharp, square topped, positive high-amplitude pulse thus generated is coupled through capacitor 94 into clipper tube 96 as shown in block 17.

With reference to tube 96, which is a pentode, such as type 6AC7, it has been found that a multielement tube is more effective that the usual type of diode, when connected as shown in block 17. Tube 96 is ordinarily non-conducting since the negative voltage $e_4$ is greater than negative voltage $e_3$.

The plate of the tube 96 maintained at potential produced by the positive pulse is thus limited to the difference between initial cathode and plate potentials or the difference between $e_3$ and $e_4$, thereby controlling the voltage amplitude of the pulses produced.

The movable contact of the selector switch 97 shown at 18 is connected through a microwave isolation filter 102 to the reflector anode of the oscillator tube 103 shown in block 19. A preferred embodiment of this invention utilizes a Sheppard-Pierce reflex Klystron oscillator tube 103, such as type 723A/B, which is capable of producing microwaves on the frequency range of 9400 to 10000 megacycles. When the plate of tube 103 is sufficiently negative, oscillations will occur. However, if the plate of the tube 103 is made excessively negative, no oscillations will occur. Advantage is taken of this fact in the operation of the selector switch. In position #1, #4, and #5 voltage $-e_3$ is applied through the microwave isolation filter 102, to the reflector anode of tube 103. The negative voltage ordinarily will cause the oscillator tube to generate microwaves continuously. However, in positions #1 and #5, modulating voltages, from a low frequency sine wave source such as the power line at X, or from an external source at Y, are applied through capacitances 99 and 101 respectively, causing the microwave amplitude to be modulated accordingly. The modulating line voltage may be obtained at X, from the voltage divider 136 and 137 from the line voltage transformer secondary 132 shown in block 23.

In position #3 a large negative voltage, $-e_5$, is obtained directly from the plate of the rectifier tube 138 in block 23. The application of $-e_5$ volts to the reflector anode of tube 103 drives the operating point of the tube out of an oscillating mode.

In position #4 the negative voltage $-e_3$ is constantly applied to the reflector anode of the tube 103 producing a continuous microwave output of substantially constant amplitude.

In position #2 a negative pulse having the predetermined timing and amplitude characteristics hereinabove described is applied through the selector switch 97 and isolating filter 102 to the reflector anode of the tube 103 thereby producing microwave pulses having the aforesaid predetermined timing and amplitude characteristics.

By varying the dimensions of the cavity of tube 103, the output microwave frequency may be controlled. Mechanical means for varying the dimensions of the cavity 104 of tube 103 is shown schematically in Fig. 1B, wherein knob 221 revolves shaft 243 which changes the dimensions of cavity 104 in a manner to be described subsequently in connection with Figs. 5 and 6.

The microwave energy within cavity 104 is picked up by loop 105 and fed through coaxial line 106. The inner conductor of the coaxial line, which protrudes into the waveguide aperture 112, is surrounded only by dielectric 107, thereby constituting a short antenna which radiates microwave energy into the waveguide cavity 121. The power radiated into the waveguide cavity 121 is dependent upon the distance which the antenna is inserted into the waveguide cavity at 112. A wedgelift mechanism, to be later described, regulates the distance of antenna insertion, and hence also controls the power level in the waveguide cavity. In Fig. 1B, a graphical distribution of current and voltage amplitudes 175 and 176 respectively, of the standing waves which are set up within the resonant cavity, is shown alongside and running parallel to the aforesaid cavity. A similar distribution is also shown for a crystal assembly 116 at 180 and 181.

The antenna and an attenuator opening are located at a current maximum and approximately a half a wavelength from the bolometer block 114. The bolometer wire 113 is located a short distance away from the end block 114 at or near a voltage maximum. The crystal assembly generally indicated as 116 is located approximately one and three-quarter wavelengths away from the antenna at a voltage maximum. Crystal assembly 116 comprises a central probe 115 which may be inserted in variable length into the waveguide cavity, at or near a voltage maximum, for the purpose of picking up a controllable amount of energy which may be rectified by the crystal 120. Stub 117 is tunable to approximately three-quarters of a wavelength within the coaxial assembly 116 for the purpose of obtaining a match to the output. The crystal output may be taken along coaxial line 118 through a microwave filter 178 to remove the crystal impedance so as to obtain maximum rectified microwave component, through the shield 19 to a D. C. amplifier in block 21, which will be described later, or through coupling capacitor 186 to output jack 185, which may be used for the purpose of observing pulse characteristics when coupled through a video amplifier to a cathode ray oscilloscope.

The reasonant frequency of the waveguide cavity 121 may be adjusted by increasing or decreasing the effective length of the waveguide cavity by means of the motion of the plunger 122. It is a feature of this invention that precise frequency adjustment may be more readily obtained due to the comparatively large number of wavelengths between the antenna and the plunger 122. For example, 5 wavelengths, $5\lambda_g$, are shown in Fig. 1B. A change in the length of a wavelength will be multiplied by the number of wavelengths between the antenna and the plunger. In this manner a greater sensitivity is obtained in the adjustment of the resonant frequency of the cavity. In addition, a number of wavelengths between the antenna and the plunger makes for the greater stability in maintaining a precise frequency.

The power level of the microwave energy supplied by this signal generator is regulated by the attenuator. The attenuator consists of a hollow cylindrical tube 295 abutting an aperture in the waveguide 121 at 108 and a dial 111, which may be rotated to vary the position of pickup loop 109 relative to the waveguide aperture. As the pickup loop 109 is withdrawn from the waveguide, the less energy is picked up. The power level of the microwave energy supplied by the signal generator to the pickup loop 109, expressed in db, varies in an approximately linear manner, with the distance of the said loop from the waveguide aperture 108. Dial 111, which controls the distance of the pickup loop from the waveguide aperture, is concentric with the attenuator tube 295 and coaxial cable 110, which transmits microwave pulses of the predetermined characteristics above set forth, from the signal generator to the equipment under test.

The bolometer wire 113 is grounded to the wave guide cavity at one end and attached to a beryllium-copper conductor strip insulated by mica washers from the end block of the waveguide cavity. The lead from the bolometer passes through microwave filter 179 to remove microwave components and then passes through the shield 19 into the bridge circuit indicated within block 20. The resistance of bolometer element 113 varies according to the amount of heating caused by the microwave energy level within the cavity. The resulting resistance unbalance at the bridge circuit at 20 is indicated on the meter 183 shown in block 22 when switch 182 is connected in position A. It is preferred to use the bolometer for energy level measurements when microwave energy is continuously radiated into the cavity. When the waveguide cavity is being pulsed with pulses of short duration, relative to the interval between pulses, the energy picked up by the bolometer wire 113 may be insufficient to cause a marked change in its resistance. Under these circumstances, the crystal assembly 116 provides rectified pulses which are fed into the D. C. amplifier, shown in block 21, through coupling capacitor 187, the aforesaid pulses being amplified by the conventional two-stage amplifier shown in block 21, the amplified pulses being fed through coupling capacitor 204 into a rectifier bridge, such as copper oxide bridge circuit rectifier comprising elements 205, 206, 207, 208, which produces a voltage proportional to the amplitude of the input pulses, which is registered on meter 183 when the switch 182 is turned to position B.

Referring now to block 23, there is shown a regulated power supply having a grounded mid-tap, a regulated positive voltage output at 163 and a regulated negative voltage output at 164. The negative voltage regulation is accomplished by two gas tubes 147 and 148, each of which may comprise a VR30/150 type tube. These tubes may be utilized in the negative regulated voltage supply since the amount of current drawn therefrom is relatively small.

The regulated negative voltage at 164 is stepped down by a voltage divider 24 tapped at four places, and provided with capacitors at the aforesaid taps to provide various constant filtered voltage outputs.

Positive voltage at 163 is regulated by means of the pentode 151 which shunts resistor 152 and provides an output current sufficient to operate the aforesaid multiple tube circuits and associated devices. Voltage regulation is provided by amplifying changes in potential, and coupling such amplified changes through the plate resistor 145 of tube 146 on to the grid of 151.

Figure 2:
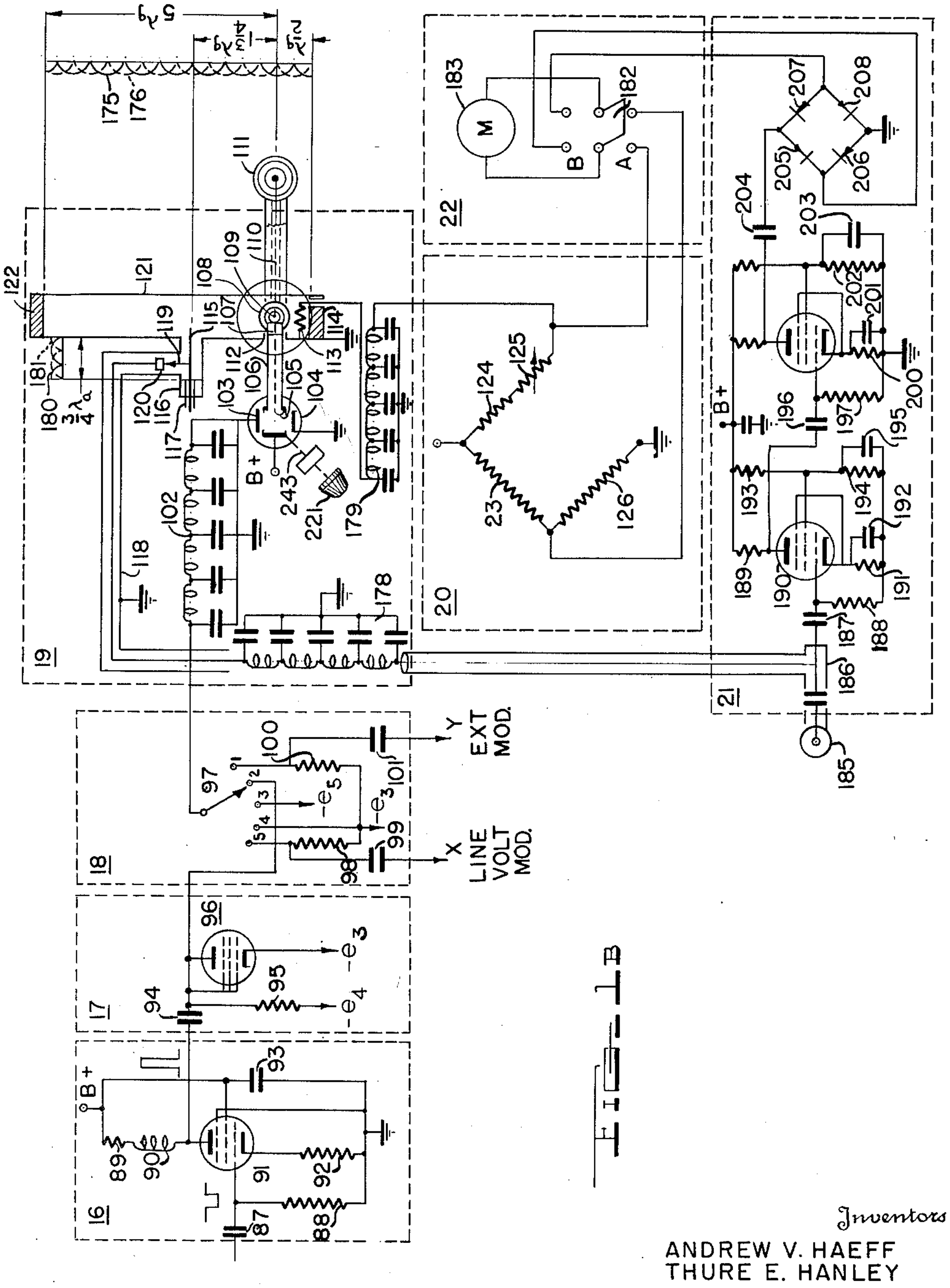
Fig. 2 is a plan view of the signal generator showing certain mechanical details of its structure with the attenuator tube being cut away on line *xx'* to simplify the view.
Figure 2:
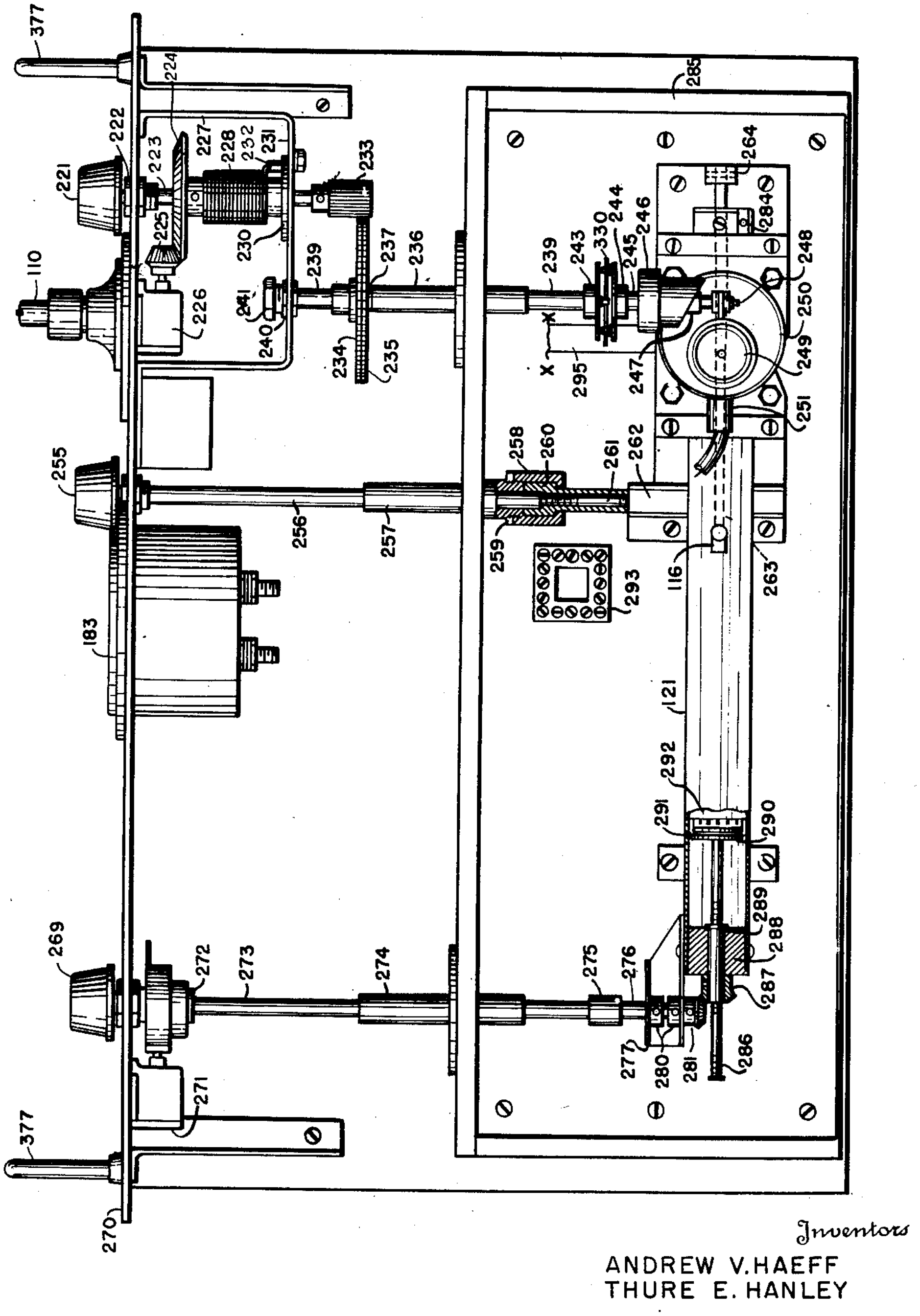

Referring now to Fig. 2, 221 is a frequency control dial whereby the resonant cavity of tube 249 may be dimensionally changed in order to vary the resonant frequency thereof. The operator, upon turning knob 221, causes the shaft 223 to revolve within the bearing 222, and simultaneously the counter 226 is operated through bevel gears 224 and 225. A plurality of washers 228 are mounted concentrically upon the shaft 223. Each of aforesaid washers has a projecting finger which enables them to be revolved but once before engaging the corresponding finger on the adjacent washer. In this manner a definite limit is placed upon a number of revolutions through which shaft 223 may be turned before the final washer engages the stop 232 which is bolted to the framework 231. Gear 233, which is on shaft 223, engages the gears 234, 235 which are arranged face-to-face with an intervening spring to prevent backlash, and which are secured to the shaft 239 by means of the hub 237. The shaft 239 is mounted to revolve within the bearing 240 and is prevented from moving axially by means of the cap 241 which screws over the end of bearing 240. The shaft 239 passes through the sleeve 236 to within the shielded enclosure 285 and is attached to the coupling member 243.

Coupling members 243, 330, 244 are adapted to transmit rotary motion to the oscillator tube housing and also permit a vertical movement of the aforesaid tube housing.

Referring now to the oscillator housing 250, there is shown mounted therein the oscillator tube 249, which may comprise a type 723 A/B. The cavity of the oscillator tube 249 is constructed in such a way that its dimensions may be changed by means of a threaded rod 248, which terminates in a square head. This arrangement will be discussed in more detail in connection with Figs. 5 and 6. The square head on rod 248 fits into a square socket in the end of shaft 247.

In order to remove the oscillator tube 249 for replacement, it is necessary to unscrew the cap 246 and withdraw the shaft socket 247 away from the square headed end of threaded rod 248. To do this, it is necessary to unscrew the cap 241 which secures the shaft 239 against axial motion. When cap 241 is removed, the shaft 239 may be slid axially and the socket at the end of the shaft 247 may be removed away from the square headed rod 248. After replacement of tube 249 the elements are reassembled as before and cap 241 replaced on the end of bearing 240.

There is thus provided a means for minutely varying the dimensions of the oscillator tube cavity, and means for limiting this dimensional variation to prevent excessive distortion and damage of the tube cavity. A sleeve 236 surrounding shaft 239 and attached to the shielded container 285 prevents radiation or loss of microwave energy from the shielded container 285. Other sleeves 257, 274 and 295 enable mechanical motion for operating internal components in the shielded container 285 to enter the shielded cabinet while preventing radiation of microwave energy therefrom. The oscillator tube housing may be moved in a vertical direction, within limits, while at the same time a rotary motion is transmitted through a coupling means to control the tube-cavity dimensions.

The wedge-lift mechanism controls the insertion of the antenna into the waveguide and thus determines the amount of energy radiated into the waveguide. Knob 255 is revolved by the operator thus turning shaft 256 which passes through sleeve 257 into the shielded container 285 to the threaded member 258. Threaded member 258 is revolved and the threaded rod 261 is caused to move axially thus producing a motion of the wedge 262. One end of lever 263 is pivoted at its fulcrum 264 and the free end of the lever lies upon the wedge. Motion of the wedge 262 causes a vertical motion of the free end of the lever 263. The vertical motion is transmitted in reduced amount to the oscillator tube housing 250 at point 265. (See Fig. 6.)

The frequency control for the resonating waveguide cavity 121 comprises a knob 269 mounted upon shaft 273, which fits within sleeve 274, sleeve 274 being attached to the shielded container 285. The amount of rotation of shaft 273 is measured by a counter 271, which engages the shaft 273 through bevel gears 272. Shaft 273 is coupled to shaft 276 by coupling member 275. Shaft 276 is mounted upon bearing support 277 and axial motion is prevented by collars 280. Mounted on the end of shaft 276 is bevel gear 281 which engages bevel gear 287 mounted upon shaft 289, which revolves within a bearing seat in the end block 288 of the cavity 121. Shaft 289 is hollow and is threaded internally. Threaded rod 286 screws into the internal threaded hole in shaft 289 and threaded rod 286 is fastened to, and prevented from revolving by contactor 291. Rotation of knob 269 causes bevel gear 287 and shaft 289 to revolve together producing axial motion of the threaded rod 286 which is transmitted to the contactor 291. Contactor 291 comprises beryllium copper spring members which, in Fig. 2, make contact with the upper and lower walls of the cavity 121. Contact member 291 is supported upon the shaft 286 by means of bracing blocks 290 and 292 which are fastened by nuts to rod 286.

Turning knob 269 effects a controlled motion of contactor 291, the motion being measured by the counter 271. The length of the resonating waveguide cavity 121 is thereby varied, and the variation of the waveguide cavity length produces a change in the resonant frequency thereof. To obtain a signal of a desired frequency, knob 269 is revolved until counter 271 reads a value given by a calibration. This moves the contactor 291 and establishes the proper length of cavity 121 to make the cavity 121 resonant at the desired frequency. Then knob 221 is rotated so as to introduce dimensional change in the cavity of the oscillator tube 249. The amount of this rotation may be determined from prior calibration and read on the counter 226. The knob 221 is rotated so as to establish a signal output from the tube having a frequency equal to the frequency of resonance of the waveguide cavity 121 previously set. The meter 183 indicates a maximum reading when the oscillator tube cavity and the waveguide cavity are both resonating at the same frequency.

The meter 183 may be connected either to the bolometer bridge in block 20 or to the crystal assembly 116 by means of the switch 182. Shown at 293 is a plurality of microwave filters through which pass all the electrical leads from the microwave generating components shown in block 19; that is, within the shielded container 285. The characteristics of these microwave filters are such as to permit pulse energy with the frequencies up to 5 megacycles to readily pass through the filter, while at the same time preventing microwave energy at a frequency of approximately 9700 megacycles from passing therethrough.

Figure 3:
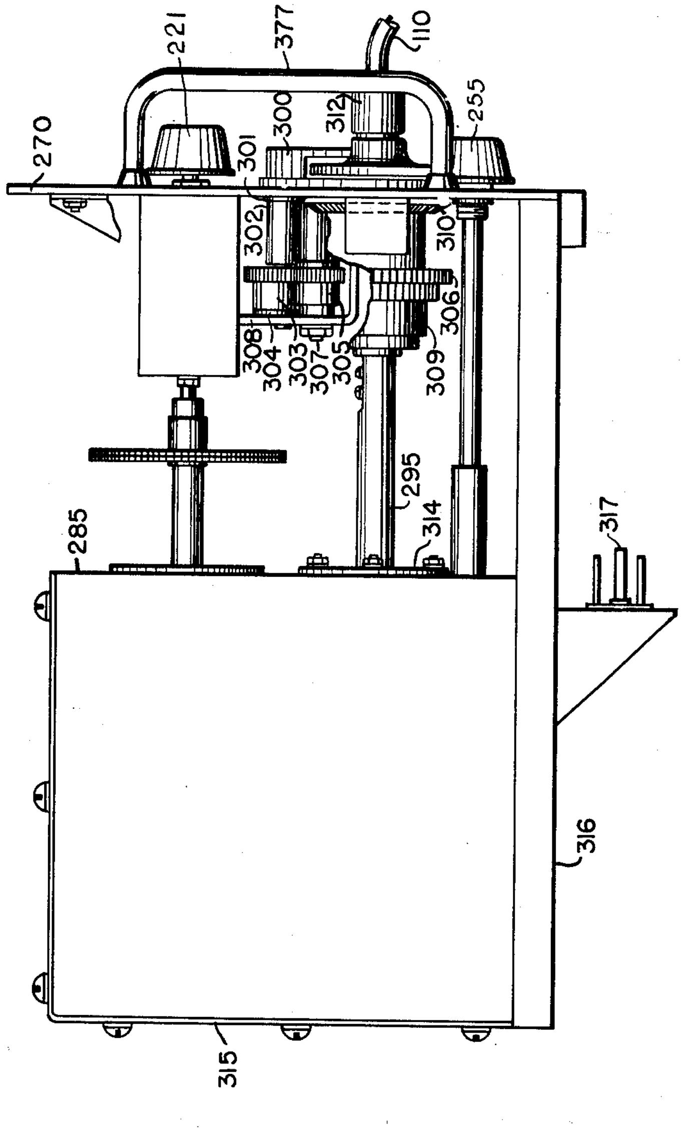
Fig. 3 is a side view of the signal generator showing Fig. 2.

Referring now to Fig. 3, there is shown a side view of the microwave signal generator equipment showing particularly the manner in which the attenuator is arranged with reference to the microwave generating components and the mechanical details concerned with the adjustment and calibration of the attenuator.

The control panel 270 is attached to the base 316 of one signal generator. On panel 270 are located all controls and indicating devices required to determine the characteristics of the microwave furnished by the signal generator to the output cable. Upon the base 316 is mounted the microwave generating components within the shielded container 285. Access to the shielded container 285 is had by means of the cover 315 which is fastened to the shielded container wall 285 by many screws to establish a plurality of contacts. Power is supplied to the microwave generator, together with the pulses from the control circuit, through the multiconnector male plug 317 which engages with a female multiconnector plug in the lower unit (not shown) in which the 6 power control circuits are contained.

The attenuator is adjusted by means of crank 300 which transmits a rotary motion to shaft 302 and thence through the gear train 303, 305 and 306. The rotary motion transmitted to gear 306 causes loop 109 to be moved axially along the hollow cylinder 295, which comprises the attenuator. The rotary motion of gear 306 is also transmitted to the counter 311 through the bevel gear 310 which is mounted on the same hollow shaft 369 as is the gear 306. The reading of the counter 311 changes the position of the pickup loop 109 relative to the aperture to the waveguide at the end of the attenuator. Calibration of the counter reading established a definite attenuation, which may be expressed in decibels, of the power level distributed to the equipment under test, relative to the power level in the waveguide cavity 121.

Figure 4:
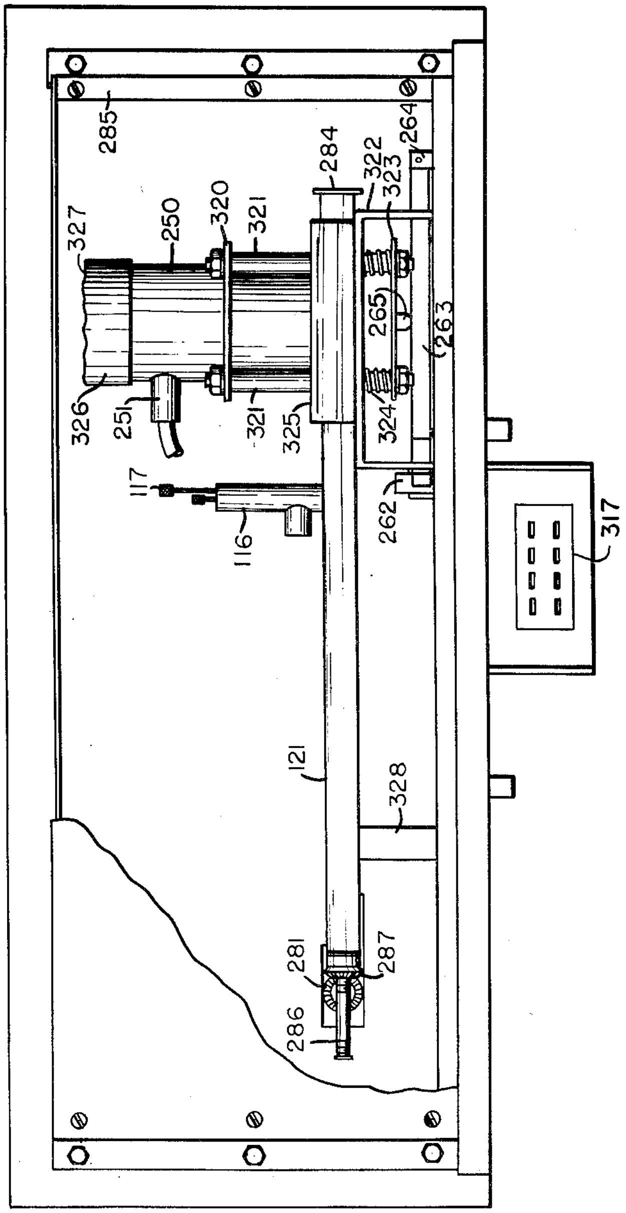
Fig. 4 is a rear view of the signal generator of Fig. 2 with the box shielding the microwave generator components being shown partly cut away to illustrate the general arrangement of the waveguide, the oscillator tube housing, and the wedge-lift mechanism, as well as the disposition of certain other components.

Referring now to Fig. 4, there is shown a rear view of the signal generator with the shield 315 partially cut away to show the arrangement of the microwave generating components. Waveguide cavity 121 is shown mounted upon the support 328. Adjustment of the electrical length of the waveguide cavity 121 is accomplished by bevel gears 281 and 287 and associated threaded rod 286. Mounted upon the cavity is shown crystal assembly 116. The end block 284 of the cavity contains the bolometer wire 113 which is supported within the waveguide cavity.

The oscillator housing 250 is enclosed by a cap 326, the top end of which comprises a wire screen 327. Wedge 262, lever 263, fulcrum 264, and bearing member 265 have been described in connection with Fig. 2 as to function. Motion of the wedge 262 causes arm 263 to be tilted and raises the bearing member 265, and with it the entire oscillator tube housing 250. Since the antenna is integrally mounted with the tube, the antenna will be moved into and out of the waveguide cavity according to the motion of 262. Springs 324 cause the bearing member 265 to be firmly pressed against the lever 263 and prevents play on the downward motion. Bearing member 265 is mounted at the center of the plate 323 which supports the four upright stubs 321 which are bolted to the plate 320, plate 320 being attached to the oscillator tube housing 250. Block 325 fixes the position of the waveguide cavity 121 relative to the tube housing 250 and also provides holes through which are passed the column members 321 with a sliding fit, thus permitting the column members vertical motion only. Tube 251 contains the power and control circuit cables necessary for the desired functioning of the oscillator tube 249.

Figures 5, 6:
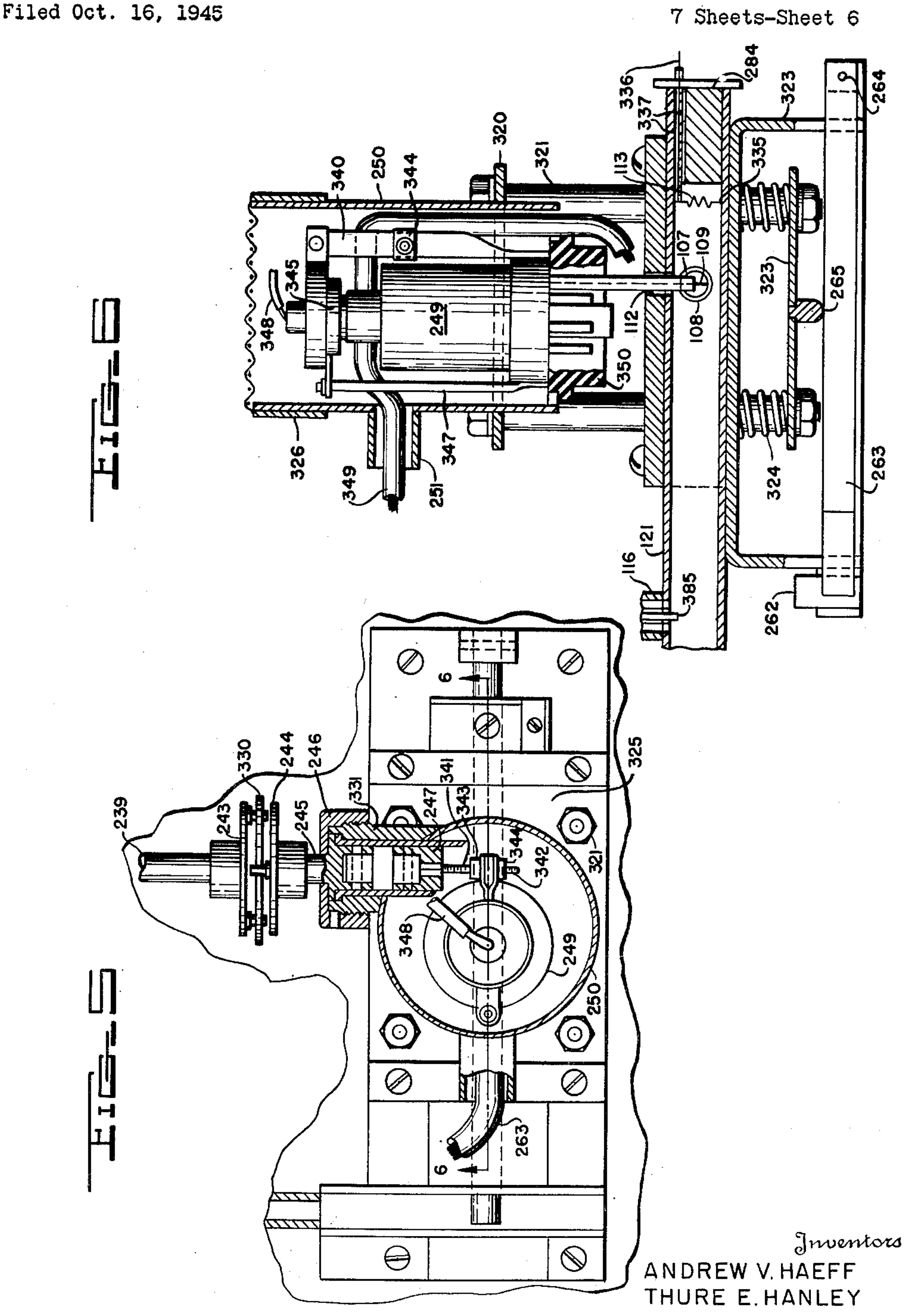
Fig. 5 is a plan view of the oscillator tube housing showing a section through the mechanical coupling device for distorting the oscillator tube cavity for controlling the frequency of the microwaves generated.
Fig. 6 is a vertical section taken substantially on line 6—6 on Fig. 5 showing the oscillator tube, the antenna, the waveguide cavity, the aperture to the attenuator, the crystal assembly attached to the waveguide, and the wedge lift mechanism.

Referring now to Fig. 5, this shows a plan view of the oscillator tube assembly and a section of the bearing and socket which is utilized to vary the resonant frequency of the oscillator tube cavity.

Shaft 239, which transmits rotary motion from knob 221, is coupled by 243, 330, 244 to shaft 245 which rotates within the sleeve 331.

Sleeve 331 is brazed to the wall of the oscillator tube housing 250. Rotation of shaft 239 is transmitted to the socket 247 into which the square head of rod 342 is inserted. Coupling 243—330—244 is of a conventional type adapted to allow both the vertical motion of the oscillator tube housing, and the rotary motion from 239 to the socket 247. Cavity 345 of tube 249 is similar to a sylphon bellows. The vertical motion of the upper portion of the cavity 345 is accomplished by means of two bowed uprights 340. To each of the two-bowed uprights, nuts 343 and 344 are attached. Nuts 343 and 344 are furnished with left and right hand threads respectively, and rod 248 is also furnished with corresponding left and right hand threads 341 and 342. Rotation of the rod 248 by shaft 239 causes nuts 343 and 344 to approach or recede from each other depending on the direction of rotation. The consequence of moving the nut 343 and 344 closer together is to cause an upward motion of the top of the cavity, which acts as a lever arm with its fulcrum at support 347. The increase in volume of the cavity produced by this means causes the resonating frequency to decrease. The reverse effect is noted when the nuts 343 and 344 are caused to move away from each other.

Cable 349 enters the oscillator tube housing through tube 251 and passes downward to the tube base 350, where the various wires comprising the cable 349 are distributed and connected to the terminals of the tube base. The tube 249 plugs into the base 350. Motion transmitted to the oscillator tube housing 250 through the bearing member 265 causes the entire assembly to move vertically thus regulating the insertion of the antenna 107 within the waveguide cavity 121.

Referring now to Fig. 6, there is shown the waveguide cavity 121 to which the crystal assembly 116 is attached. Rod 385 comprises a probe, having variable insertion into the waveguide the purpose of which is to pick up microwave energy for rectification by the crystal assembly. The attenuator tube extends up to and abuts the aperture 108 in the waveguide cavity 121. Pickup loop 109 is located within the attenuator tube 295 at a controllable distance from the waveguide aperture at 108 thereby enabling a measurable variable attenuation of the power level to be obtained and transmitted to the equipment under test. End block 284, which is inserted into waveguide cavity 121 carries the bolometer element 113. Element 113 is attached and grounded at 335 to the end block 284 and is connected to a beryllium-copper strip 336 insulated by the mica washers 337, which is attached to the upper end of the block 284.

Figure 7:
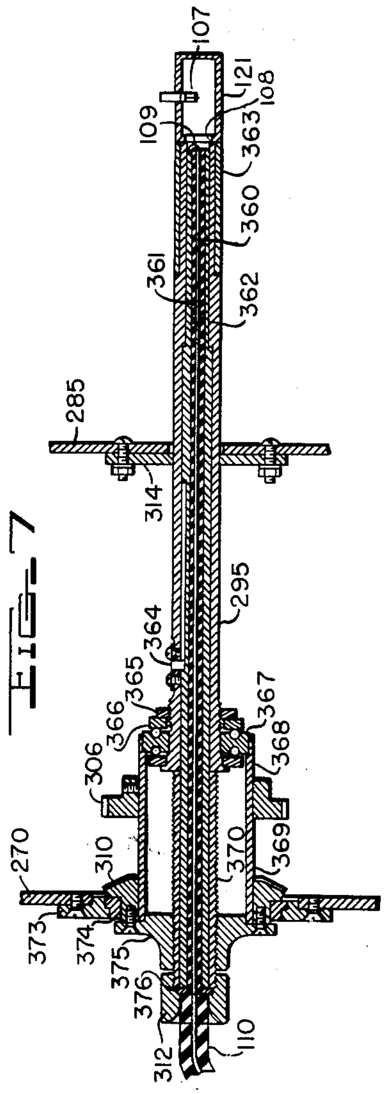
Fig. 7 is a detailed section through the attenuator, showing means for withdrawing the attenuator loop.

Referring to Fig. 7, there is shown a section through the attenuator assembly and the waveguide cavity 121. The attenuator assembly fits into a sleeve 363 brazed to aperture 108 in the cavity wall. Shown also is a fragmentary view of the antenna 107 inserted into the waveguide cavity 121. Aperture 108 permits microwave energy to travel into the attenuator tube 295 whereupon this energy is picked up by loop 109. Attenuator tube 295 is attached to plate 314 which is bolted to the shielded cabinet 285 to prevent leakage of microwave energy into the surrounding space.

In order to move the pickup loop away from the microwave cavity 121, there is provided an inner cylinder 362 which is capable of being moved axially within the outer attenuator cylinder 295. The tube 362 is provided with a slot running parallel to the axis thereof. Plug 364 is attached to the attenuator cylinder 295, and it fits into the slot in 363. Thus constrained, the inner cylinder 362 may be moved within only a limited distance axially, and may not be rotated relative to the outer cylinder which is attached to the casing.

Motion from the crank 300 (Figure 3) is transmitted through the gear train to gear 306 thus causing the hollow shaft 369 to revolve on bearings 374 and 367. Bearing 374 is supported upon panel 270. Rotation of the hollow shaft 369 produces axial motion of the threaded hollow cylinder 370 within the threaded end block 375. Hollow cylinder 362 is integrally secured to cylinder 370 by any suitable means such as brazing or the like. Thus hollow cylinder 362 is moved parallel to the axis of the attenuator tube and in this manner pickup loop 109 is moved to or from aperture 108. Dielectric filler 361 within tube 362 provides an insulated support for a central conductor 360, thus constituting a coaxial cable, which extends into the flexible coaxial cable 110. Cable 110 is attached to the end of the tube 370 by means of the cap screw 312 which is screwed over the end of the threaded hollow tube 370.

Figure 8:
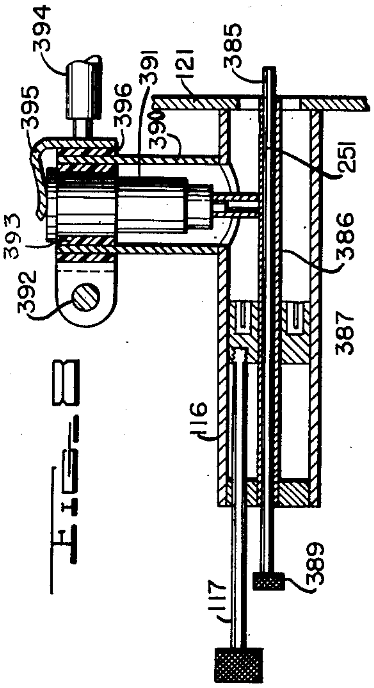
Fig. 8 is a section through the crystal assembly.

Referring now to Fig. 8, which is a cross-sectional view through the crystal assembly, there is shown a main cylinder 116 with a cylinder 390 connected at right angles thereto. Cylinder 390 forms a coaxial connector and housing for the inserted crystal 391. The crystal 391 may be of the type usually employed for the rectification of microwaves, such as a type 1N21. Crystal 391 fits into cylinder 390 supported within a polystyrene washer 393 and is clamped in place by means of the spring clamp 395. Spring clamp 395 is seated over the outer surface of the tube 390 upon a second polystyrene washer 396 and is tightened by means of screw 392. Attached to the clamp 395 is coaxial cable 394, the outer conductor of which is grounded. (Not shown.) The impedance of the crystal assembly is matched to obtain an adequate rectified output from the crystal assembly. Matching is accomplished by contactor 387 which is provided with an adjusting rod 117. Contactor 387 is in spring contact with the inner walls of 116 and central conductor 386, thus providing good electrical contact thereto. Central conductor 386 comprises a cylinder against which the crystal assembly 391 is fitted. Through the hollow center of cylinder 386 passes antenna 385 which may be variably inserted within an aperture in the cavity wall 121 by knob 389. The purpose of this arrangement is to control an amount of energy picked up by the crystal assembly.

It will be understood that various embodiments of the above invention described herein are for the purpose of illustration only, and various changes and modifications may be made therein without departing from the scope of this invention. The invention is not to be considered as limited to the preferred embodiment herein given but only by the scope of the appended claims.

The invention described herein may be manufactured and used by or for the Government of the United States of America for governmental purposes without the payment of any royalties thereon or therefor.

What is claimed is:

1. In a microwave signal generator, the combination of a waveguide cavity having a plurality of apertures, an oscillator tube having a cavity and an antenna, means varying the dimensions of said tube cavity, and means varying the distance to which said antenna is inserted into one of said apertures to adjust the power radiated into said waveguide cavity, said waveguide cavity being tuned to the same resonant frequency as the resonant cavity of the said tube; being further characterized by said waveguide cavity having a length equal to a plurality of wavelengths, whereby greater frequency sensitivity and greater stability may be achieved.

2. In combination, a resonant waveguide cavity having a length equal to a plurality of wavelengths, apertures in said waveguide cavity, a microwave generator for radiating microwave energy into said waveguide cavity, means for adjusting the resonance frequency of said cavity, means for measuring the energy level in said cavity, means for withdrawing microwave energy from said cavity, and means for controllably pulsing said microwave generator.

3. A microwave signal generator comprising in combination an oscillator tube having a tunable cavity and an antenna, means for causing said tube to produce pulse modulated oscillations and sustained oscillations selectively, a tunable waveguide resonant cavity having at least one aperture in the wall thereof for receiving said antenna therein, and first and second metering means respectively responsive to pulsed oscillations and sustained oscillations in said waveguide cavity for indicating when said cavities are tuned to the same resonant frequency.

4. A microwave signal generator comprising in combination an oscillator tube having a tunable cavity and an antenna, means for causing said tube to produce pulse modulated oscillations and sustained oscillations selectively, a tunable waveguide resonant cavity having a plurality of apertures in the walls thereof, said antenna being received in said waveguide cavity through one of said apertures, attenuator output means coupled to said waveguide cavity through another of said apertures, and metering means responsive to pulsed oscillations and sustained oscillations respectively in said waveguide cavity for indicating when said cavities are tuned to the same resonant frequency.

5. A microwave signal generator comprising in combination an oscillator tube having a tunable cavity and an antenna, means for causing said tube to produce pulse modulated oscillations and sustained oscillations respectively, a tunable waveguide resonant cavity having a plurality of apertures in the walls thereof, said antenna being received in said waveguide cavity through one of said apertures, means for varying the depth of penetration of said antenna into said waveguide cavity for controlling the level of microwave energy therein, attenuator output means coupled to said waveguide cavity through another of said apertures, and metering means responsive to pulsed oscillations and sustained oscillations respectively in said waveguide cavity for indicating when said cavities are tuned to the same resonant frequency.

6. In a microwave generator, in combination, a shielded compartment, a resonant waveguide cavity having a length equal to a plurality of wavelengths positioned in said compartment, aperture means in said waveguide cavity, means for controllably radiating microwave energy into said cavity, means for measuring the energy level in said cavity, means for controllably withdrawing a measured level of energy from said cavity, and means for adjusting and measuring the resonant frequency of said cavity, the last-named means including a movable contactor in one end of said waveguide, a sleeve positioned in said aperture means, a shaft passing from without to within said compartment through said sleeve, and means responsive to movement of said shaft for moving said contactor.

7. In a microwave generator, in combination, a resonant waveguide cavity having a length equal to a plurality of wavelengths, apertures in said waveguide cavity, means for controllably radiating microwave energy into said cavity, means for adjusting the resonant frequency of said cavity, means for measuring the energy level of pulsed microwaves in said cavity, said measuring means comprising a crystal assembly mounted against an aperture of said waveguide, and an amplifier, a rectifier, and a microammeter fed from said crystal assembly in the order named.

8. In a microwave generator, a device for regulating the microwave energy level of a resonant waveguide cavity, said cavity having an input aperture and a plurality of output apertures for said energy, an oscillator feeding an antenna inserted into said input aperture to supply energy to the cavity, a housing for the oscillator adjustably mounted on the waveguide cavity, said energy level being varied by varying the insertion distance of said antenna into said input cavity, means for varying said insertion distance by varying the relative positions of the housing and the waveguide cavity.

9. In a microwave generator, a frequency sensitive measuring and determining device comprising a waveguide cavity having a length equal to a plurality of wavelengths, a plurality of apertures in said waveguide, an antenna for radiating microwave energy inserted through one of said apertures, a contactor block in one end of the said waveguide means forming said contactor block along said waveguides, the frequency change caused by the motion of said contactor being magnified by the plurality of waveguide wavelengths between said contactor and said antenna, a wedge-lift mechanism for varying the insertion of the said antenna into one of said apertures whereby the power level in said waveguide cavity may be varied.

10. In a microwave generator, a shielded container having openings in the wall thereof comprising a first sleeve and a second sleeve, first and second control shafts passing through said sleeves, a device for controlling the frequency, an oscillator tube having a cavity, said cavity having a coaxial line leading therefrom terminated in an antenna, a waveguide cavity having a plurality of apertures, said antenna being inserted into said aperture, a threaded rod for varying the dimensions of said cavity by a rotary motion of said threaded rod, a housing for said tube having a sleeve, a socketed shaft within said sleeve engaging said rod, a coupling member attached to said shaft, means for transmitting a rotary motion to said coupling member through said first sleeve in the wall of said container, whereby the frequency of the microwave output of said tube is varied, and wedge-lever means of raising or lowering said housing and said antenna comprising the said second control shaft passing through the said second sleeve in the wall of said container, said coupling member being adapted to transmit rotary motion to said housing while permitting vertical motion of the said housing, said rotary motion being maintained within limits; whereby the power radiated by said antenna into said waveguide cavity may be varied.

11. In a microwave signal wave generator, a shielded container for the microwave generating components, a waveguide cavity containing a plurality of apertures, an antenna radiating microwave energy into a first said aperture, an attenuator comprising an outer tube mounted against a second said aperture, a sleeve attached to said container, an outer tube mounted within said sleeve, an inner tube, said inner tube comprising a coaxial cable terminated in a pick-up loop, an axial slot in said tube, a plug fastened to said outer tube engaging said slot, a gear train driven by an actuating means, a gear mounted on a hollow shaft concentric with said coaxial cable, a control panel, said shaft being supported within a first bearing attached to the control panel of said signal generator, a second bearing mounted on said outer tube, said hollow shaft being mounted with said second bearing, a threaded block mounted within said hollow shaft and engaged with a screw-thread concentric with and attached to said coaxial cable, whereby a rotation of actuating means will cause said pick-up loop to move axially with relation to the waveguide apertures.

12. In a microwave generator, a shielded container having sleeves in the walls thereof, a waveguide cavity comprising a waveguide element having a slidable contactor, an end block and a plurality of apertures in said waveguide, an antenna inserted into one of said apertures, the distance of said insertion being variable, an attenuator tube mounted against a second of said apertures, a threaded rod attached to said contactor, an internally threaded first shaft and a first bevel gear attached thereto, said threaded rod being screwed into the said internal thread in said first shaft, a second bevel gear mounted on a second shaft, said second shaft passing through said sleeve in said shielded container, a third bevel gear on said second shaft, a counter for recording the motion of said contactor outside said container driven by said third bevel gear, and actuating means for revolving said shaft, whereby the resonant frequency of said waveguide cavity may be calibrated.

13. In a microwave generator, a shielded container for microwave components, said shielded container having sleeves in the walls thereof, said components including a waveguide cavity having a plurality of apertures, and an antenna inserted into a said aperture, an oscillator tube, a housing comprising a container for said tube, said tube having said antenna protruding therefrom, said container mounted within a plate, four upright rod members attached to said plate, said uprights passing through holes in a supporting block, a bracket for mounting said block, a bottom plate joining said upright members, a bearing member in the center of said bottom plate, a lever and a wedge, a free end of said lever resting upon said wedge, said wedge horizontally actuated by screw engagement with a threaded shaft passing through said sleeve in said shielded container, springs mounted upon said uprights adapted to force said bearing member against said lever, whereby rotary motion applied external to said shielded container produces a horizontal motion of said tube housing, thus enabling the insertion of the said antenna to be varied with a said waveguide aperture, thereby varying the level of microwave energy radiated into said waveguide cavity.

14. A microwave generator comprising a shielded container for the microwave components, a resonant waveguide cavity having a length equal to a plurality of wavelengths, at least one aperture in said waveguide cavity, means for controlling and measuring the radiation of microwave energy into said cavity comprising an antenna, the insertion of which into said aperture may be varied, and means for varying the insertion of said antenna comprising a wedge lift mechanism, a shaft passing through a sleeve in said shielded container whereby said wedge lift mechanism is actuated, a counter geared to said shaft, means for adjusting the resonant frequency of said cavity, means for measuring the energy level in said cavity, and means for controllably withdrawing microwave energy from said cavity.

References Cited in the file of this patent

UNITED STATES PATENTS

| Number | Name | Date |
|---|---|---|
| 1,877,287 | Ferris | Sept. 13, 1932 |
| 2,037,160 | Ferris | Apr. 14, 1936 |
| 2,204,179 | George | June 11 ,1941 |
| 2,247,234 | Hansell | June 24, 1941 |
| 2,248,787 | Schrumpf | July 8, 1941 |
| 2,280,949 | Hall | Apr. 28, 1942 |
| 2,304,186 | Litton | Dec. 8, 1942 |
| 2,310,695 | Higgins | Feb. 9, 1943 |
| 2,312,810 | Finch | Mar. 2, 1943 |
| 2,337,214 | Tunick | Dec. 21, 1943 |
| 2,349,440 | Lavoie | May 23, 1944 |
| 2,398,606 | Wang | Apr. 16, 1946 |
| 2,405,237 | Ruhlig | Aug. 6, 1946 |
| 2,407,530 | Bielski | Sept. 10, 1946 |
| 2,408,895 | Turner | Oct. 8, 1946 |
| 2,410,707 | Bradley | Nov. 5, 1946 |
| 2,414,456 | Edson | Jan. 21, 1947 |
| 2,431,941 | Kihn | Dec. 2, 1947 |
| 2,457,997 | George | Jan. 4, 1949 |
| 2,466,439 | Kannenberg | Apr. 5, 1949 |
| 2,491,669 | Larson | Dec. 20, 1949 |